US011054670B2

(12) United States Patent
Sheldon et al.

(10) Patent No.: US 11,054,670 B2
(45) Date of Patent: Jul. 6, 2021

(54) FLEXIBLE EYEWEAR ASSEMBLY

(71) Applicant: Brent Sheldon, Miami Beach, FL (US)

(72) Inventors: Brent Sheldon, Miami Beach, FL (US); Guy Brousseau, Jr., Marieville (CA)

(73) Assignee: Brent Sheldon, Miami Beach, FL (US)

( * ) Notice: Subject to any disclaimer, the term of this patent is extended or adjusted under 35 U.S.C. 154(b) by 0 days.

(21) Appl. No.: 15/890,865

(22) Filed: Feb. 7, 2018

(65) Prior Publication Data

US 2019/0243157 A1    Aug. 8, 2019

(51) Int. Cl.
G02C 5/06      (2006.01)
G02C 1/06      (2006.01)
G02C 1/08      (2006.01)
G02C 1/00      (2006.01)

(52) U.S. Cl.
CPC .............. G02C 5/06 (2013.01); G02C 1/06 (2013.01); G02C 1/08 (2013.01); G02C 1/10 (2013.01); G02C 2200/08 (2013.01)

(58) Field of Classification Search
CPC ................. G02C 1/00–10; G02C 5/02–10
USPC .......... 351/63–65, 67–110, 124–139, 56, 61, 351/154, 178
See application file for complete search history.

(56) References Cited

U.S. PATENT DOCUMENTS

| | | | | |
|---|---|---|---|---|
| 4,822,158 A * | 4/1989 | Porsche | .................... | G02C 1/04 351/124 |
| 5,657,106 A * | 8/1997 | Herald, Jr. | .............. | A61F 9/025 2/437 |
| 5,802,622 A * | 9/1998 | Baharad | ..................... | A61F 9/02 2/2.5 |
| 6,074,059 A | 6/2000 | Glass et al. | | |
| 7,431,452 B2 | 10/2008 | Sheldon | | |
| 7,591,555 B1 | 9/2009 | Chen | | |
| 8,104,890 B2 * | 1/2012 | Blanshay | ................. | G02C 9/00 351/47 |
| 8,172,394 B2 | 5/2012 | Sheldon | | |
| 9,326,893 B2 * | 5/2016 | Wang-Lee | ............. | A61F 9/026 |
| 9,527,252 B2 | 12/2016 | Sheldon et al. | | |
| 2003/0169399 A1 * | 9/2003 | Smith | ..................... | G02C 7/081 351/98 |
| 2006/0098159 A1 | 5/2006 | Canavan et al. | | |
| 2006/0250570 A1 * | 11/2006 | Friedman | ................. | G02C 5/04 351/47 |

(Continued)

OTHER PUBLICATIONS

Stewart, W.; International Search Report from corresponding PCT Application No. PCT/CA2019/050160; search completed Apr. 3, 2019.

*Primary Examiner* — Marin Pichler
*Assistant Examiner* — Alberto J Betancourt

(57) ABSTRACT

A flexible eyewear assembly is described. The assembly includes first and second rigid frame portions each having an opening therein. The assembly also includes a flexible component. The flexible component includes first and second lens retainers configured to engage the first and second rigid frame portions along an inner edge thereof adjacent the respective opening, and sized to retain first and second lenses therein; and a flexible bridge portion connecting the first lens retainer to the second lens retainer, to connect the first and second rigid frame portions with separation therebetween, when the first and second lens retainers are engaged with the flexible component.

18 Claims, 9 Drawing Sheets

(56) References Cited

U.S. PATENT DOCUMENTS

| | | | |
|---|---|---|---|
| 2008/0088791 A1* | 4/2008 | Smith | G02C 9/00 351/57 |
| 2016/0154253 A1* | 6/2016 | Benvegnu' | G02C 5/02 351/125 |
| 2017/0045758 A1* | 2/2017 | Bailey | G02C 5/008 |

* cited by examiner

FLEXIBLE EYEWEAR ASSEMBLY

TECHNICAL FIELD

The following relates to flexible eyewear assemblies.

BACKGROUND

Eyewear such as eyeglasses generally include a frame that supports one or more lenses. The frame typically includes a nose bridge or nose pieces that engage the user's nose to support the eyewear on the user's head. Eyeglasses also typically include a pair of arms attached to (or integral with) the frame, to further support the eyeglasses, e.g. by resting the arms on the user's ears or engaging their head in the temple region. Other eyewear may include other support elements such as straps or bands (e.g., in sports goggles).

Eyeglasses have traditionally utilized frames made from substantially rigid materials such as plastics, metals, or composite materials. The rigidity of these materials supports the lenses in the frames, and substantially maintains the shape of the eyeglasses such that they consistently fit on a user's head as intended. A drawback of this rigidity is that the frames can only typically withstand some flexure and can be prone to breakage or deformation.

Flexible components have been used in eyewear, for example, flexible arms and flexible portions of the eyewear frames. Various challenges can arise in construction, assembly, and use when incorporating flexible elements. For example, the flexibility should not cause the frames to deform and thus lose their shape over time. Other challenges include assembly complexities and costs associated with using multiple different materials.

It is an object of the following to address at least one of the above-noted disadvantages.

SUMMARY

In one aspect, there is provided a flexible eyewear assembly comprising: first and second rigid frame portions each having an opening therein; and a flexible component comprising: first and second lens retainers configured to engage the first and second rigid frame portions along an inner edge thereof adjacent the respective opening, and sized to retain first and second lenses therein; and a flexible bridge portion connecting the first lens retainer to the second lens retainer, to connect the first and second rigid frame portions with separation therebetween, when the first and second lens retainers are engaged with the flexible component.

In an implementation, the flexible component is overmolded to the first and second rigid frame portions. In another implementation, the flexible component is a separate component attached to the first and second rigid frame portions during assembly.

In another aspect, there is provided a flexible component for eyewear, the flexible component comprising: first and second lens retainers configured to engage first and second rigid frame portions of the eyewear each having an opening therein, along an inner edge thereof adjacent the respective opening, and sized to retain first and second lenses therein; and a flexible bridge portion connecting the first lens retainer to the second lens retainer, to connect the first and second rigid frame portions with separation therebetween, when the first and second lens retainers are engaged with the flexible component.

BRIEF DESCRIPTION OF THE DRAWINGS

Embodiments will now be described with reference to the appended drawings wherein.

DETAILED DESCRIPTION

To provide flexibility in eyewear such as eyeglasses, rigid frame portions separated at the bridge can be held together by a flexible component that is overmolded or otherwise attached to the rigid frame portions to both position openings for the eyewear lenses in the appropriate location and provide flexibility in the eyewear at the bridge area. The flexible component can be positioned along the interior edge of the rigid frame portions and include lens retainers that hold the eyewear lenses therein.

Figure 1:
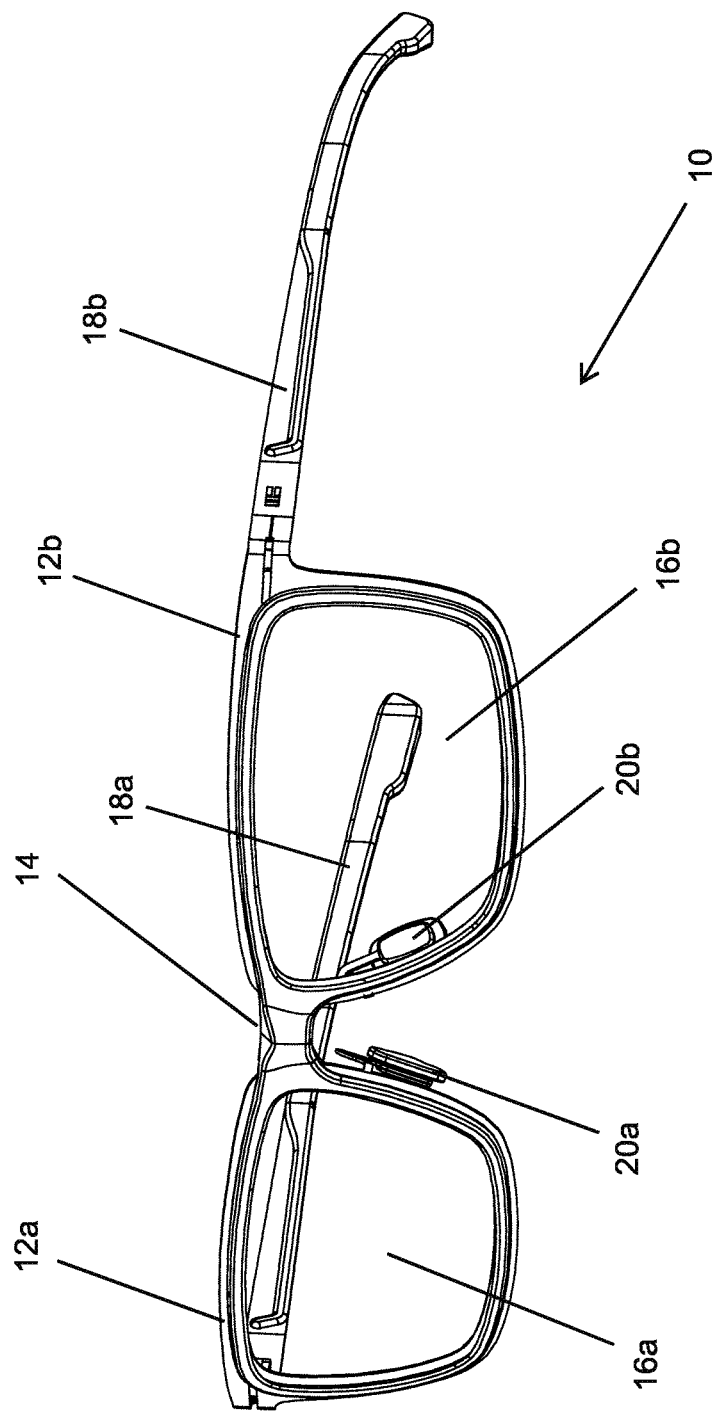
FIG. 1 is a perspective view of eyewear assembled with a flexible component.

Turning now to the figures, FIG. 1 provides a perspective view of an assembled eyewear 10, also referred to interchangeably herein as an eyewear assembly 10 or eyewear 10 for brevity. The eyewear 10 includes a pair of separate rigid frame portions 12, in this example a first rigid frame portion 12*a* and a second rigid frame portion 12*b*. A first arm 18*a* is connected to the first rigid frame portion 12*a*, and second arm 18*b* is connected to the second rigid frame portion 12*b*. The first rigid frame portion 12*a* includes or otherwise supports a first nose piece 20*a*, and the second rigid frame portion 12*b* includes or otherwise supports a second nose piece 20*b*.

The rigid frame portions 12*a*, 12*b* are supported by and positioned relative to each other, and in turn positioned on either side of the user's head in aligned with their eyes, through engagement with a flexible component 14. The flexible component 14 fits within the rigid frame portions 12*a*, 12*b* as described in greater detail below, effectively connecting the first and second frame portions 12*a*, 12*b* via a bridge portion thereof. The flexible component 14 retains or otherwise holds or secures a pair of lenses 16, in this example a first lens 16*a* and a second lens 16*b*.

Figure 2:
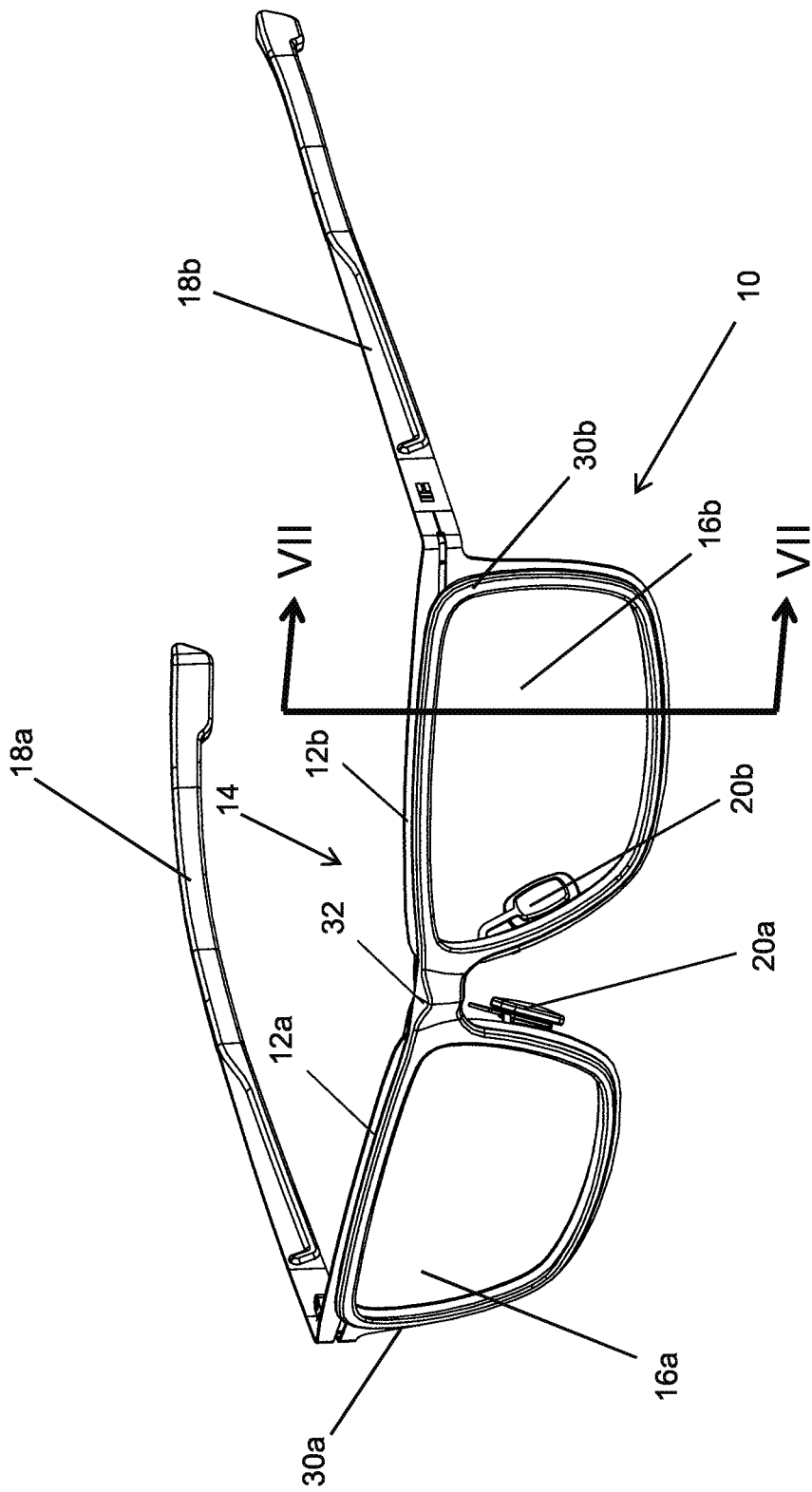
FIG. 2 is a perspective view of the eyewear shown in FIG. 1.
Figure 3:
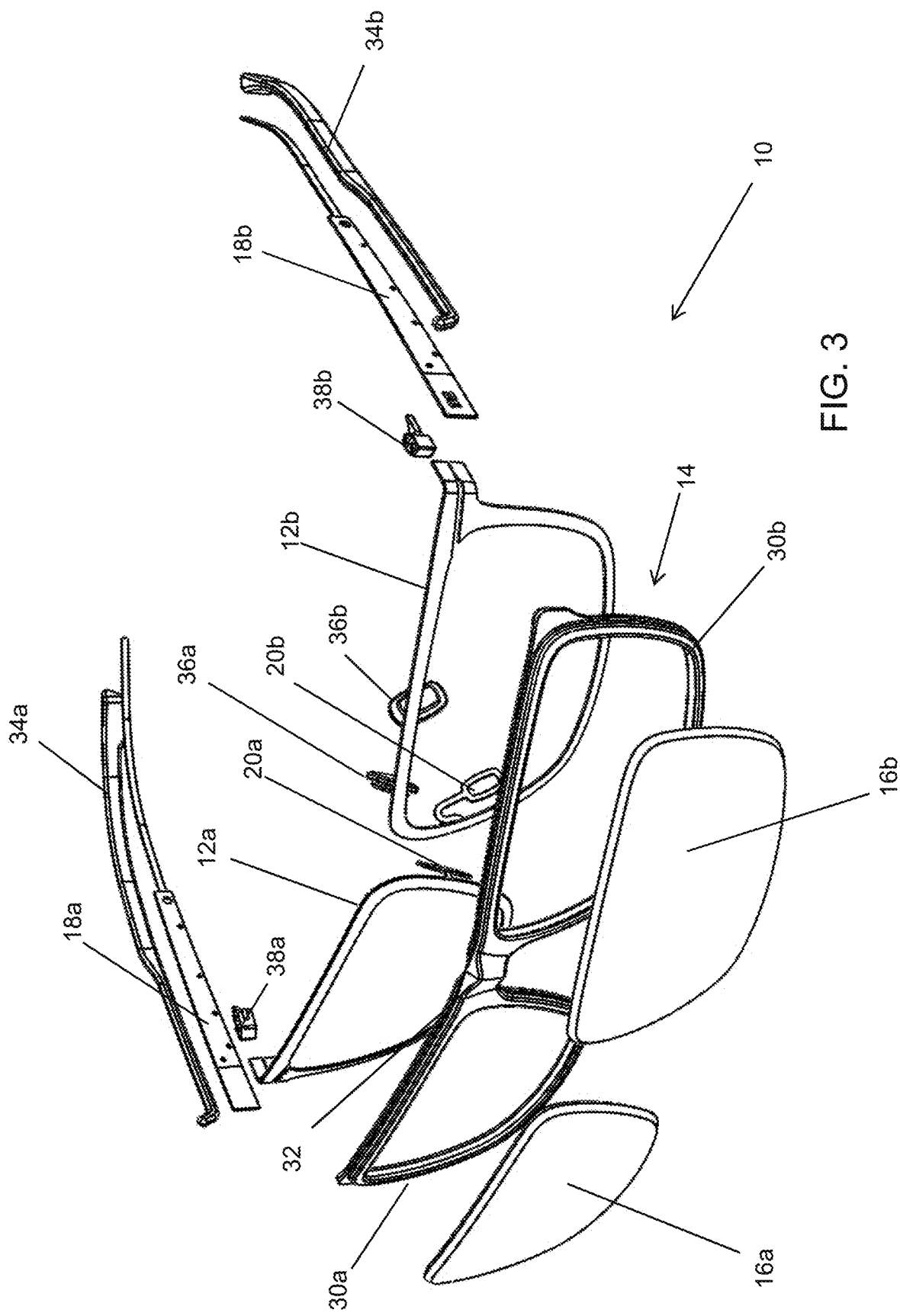
FIG. 3 is an exploded perspective view of the eyewear shown in FIG. 2.

Additional details of the eyewear 10 are apparent from FIGS. 2 and 3. The flexible component 14, shown translucently in FIG. 2, includes a first lens retainer 30*a* and a second lens retainer 30*b* coupled to each other via a flexible bridge portion 32. The flexible bridge portion 32 enables the eyewear 10 to be flexed such that the rigid frame portions 12*a*, 12*b* and arms 18*a*, 18*b* attached thereto can be bent or otherwise separated or twisted relative to each other. This allows, for example, a user to slightly flex the arms 18*a*, 18*b* away from each other when placing the eyewear 10 on their head, with resiliency in the flexible bridge portion 32 causing the arms 18*a*, 18*b* to return towards each other and seat against the user's head and on their ears. This flexibility also resists breakage of the rigid frame portions 12*a*, 12*b* by permitting them to flex, twist and to a certain extent fold, e.g., if the eyewear 10 falls, is sat-upon by the user, is stuffed into a purse or bag, etc.

As shown in FIG. 3, the arms 18 can be connected to a respective rigid frame portion 12 via a hinge component 38. In this example, a first hinge component 38a connects the first arm 18a to the first rigid frame portion 12a, and a second hinge component 38b connects the second arm 18b to the second rigid frame portion 12b. In this example, each arm 18 has a molded temple piece 34 attached thereto. Particularly, a first molded temple piece 34a is attached to the outwardly facing surface of the first arm 18a, and a second molded temple piece 34b is attached to the outwardly facing surface of the second arm 18b. The molded temple pieces 34 can be provided for aesthetics and/or for comfort. Each nose piece 20a, 20b can also have a respective nose pad 36a, 36b attached thereto as is known in the art.

The flexible component 14 is preferably overmolded to/on/with the rigid frame portions 12a, 12b using any suitable overmolding process. Overmolding, sometimes referred to as two times injection molding, is a process where a single part is created using two or more different materials in combination. Typically, the first material (or substrate) is partially or fully covered by overmolded material during the manufacturing process. In this case, the rigid frame portions 12a, 12b would act as the substrate that is overmolded with the material used to create the flexible component 14 thereon, which is generally a softer plastic, rubber, or elastomer (e.g., PTE), or other suitable material. It can be appreciated that the flexible component 14 would typically be overmolded to the rigid frame portions 12a, 12b, prior to assembly of the lenses 16a, 16b and arms 18a, 18b.

The lenses 16a, 16b may then be inserted into the openings provided by the first and second lens retainers 30a, 30b respectively, and held relative to the rigid frame portions 12a, 12b with the flexible component 14 interposed therebetween.

The flexible component 14 can also be inserted into and around the rigid frame portions 12a, 12b rather than using overmolding, as explained in greater detail below.

Figure 4:
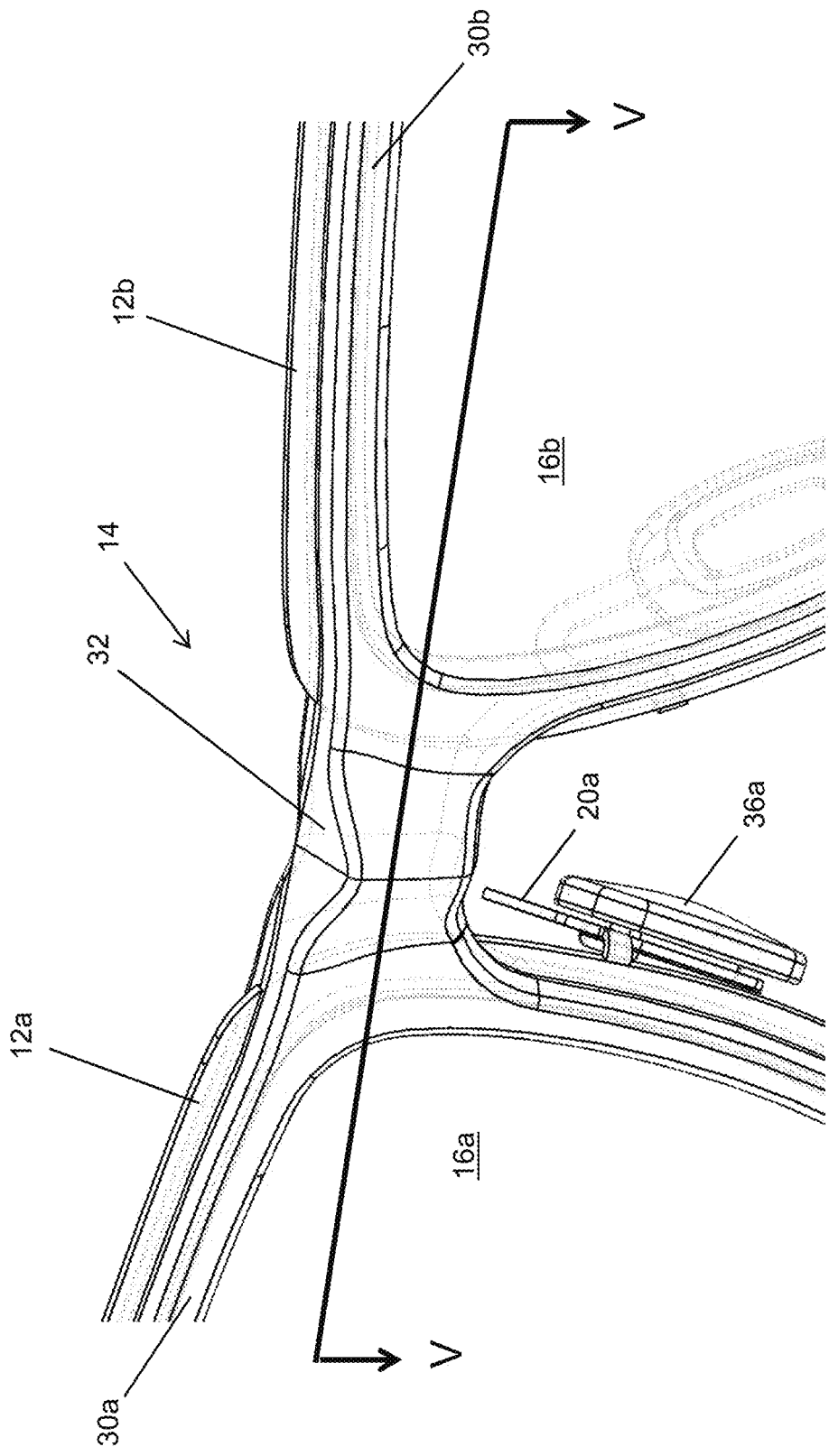
FIG. 4 is an enlarged perspective view of a portion of the assembled eyewear shown in FIG. 2.

As can be seen in FIG. 4, the flexible component 14, whether overmolded onto the rigid frame portions 12 or assembled as a separate member, surrounds the interior periphery of the openings in the rigid frame portions 12 and at least partially bears against the faces of rigid frame portions 12 on both sides to retain the rigid frame portions 12 together. In the example shown in FIG. 4 this is evident from the upper edges of the rigid frame portions 12a, 12b extending above the lens retainers 30a, 30b. When constructed as a separate piece, the flexible component 14 can be constructed to include slots, ridges, depressions, grooves or other recessed areas to accommodate insertion of the edges of the rigid frame portions 12a, 12b on one side (outer periphery), and the lenses 16a, 16b on the other side (inner periphery). In this way, as shown in the cross-sectional view of FIG. 5, the relatively softer material of the flexible component 14 holds the rigid frame portions 12a, 12b together while providing a surface into which the lenses 16a, 16b can be inserted. For example, the inner periphery of the lens retainers 30a, 30b can be provided with a standard optician's groove to accept insertion of the lenses 16a, 16b. In this way, the lenses 16a, 16b are held firmly within the rigid frame portions 12a, 12b without physically contacting them, allowing insertion and removal into and out of the flexible component 14 making assembly and maintenance more convenient. The rigid material used in the frame portions 12a, 12b can also inhibit the inner grooves on the lens retainers 30a, 30b from deforming and inadvertently releasing the lenses 16a, 16b when manipulated or worn by the user, all while the softer flexible component 14 is able to hold the lenses 16a, 16b.

Figure 5:
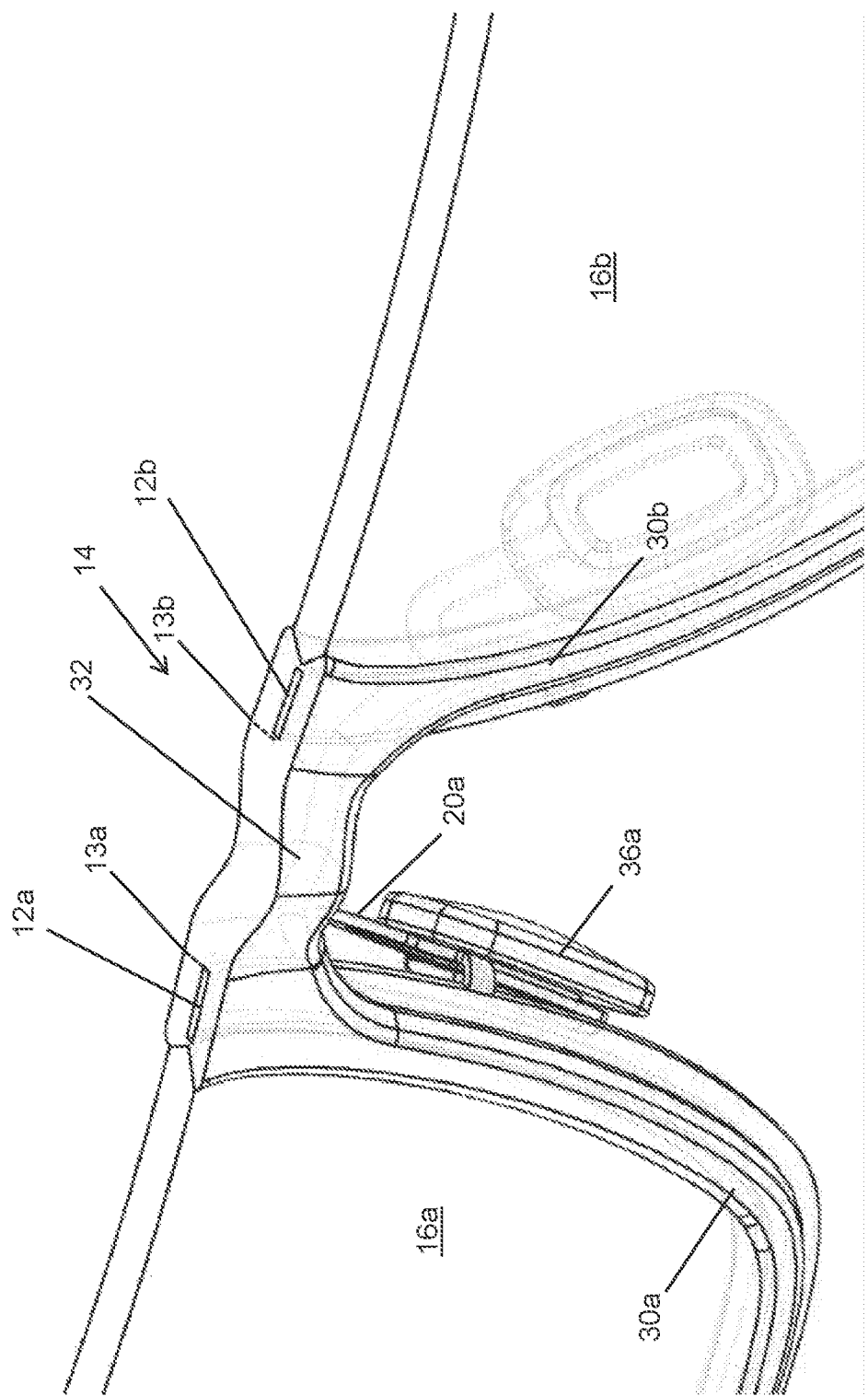
FIG. 5 is a sectional perspective view along line V-V in FIG. 4.
Figure 6:
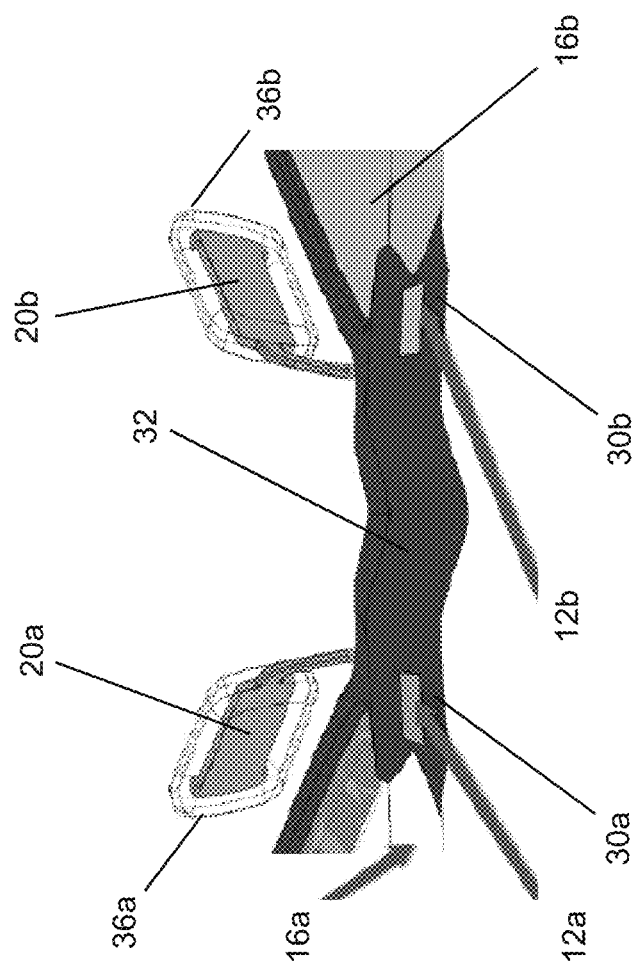
FIG. 6 is a sectional plan view along line V-V.

In the example shown in FIGS. 5 and 6, it can be seen that by overmolding the flexible component 14 onto the rigid frame portions 12a, 12b, the flexible component 14 can completely surround the areas of the rigid frame portions 12a, 12b near the bridge portion 32 to effectively hold the assembly together while providing the inherent flexibility of the flexible bridge portion 32. In this way, both flexibility and rigidity can be brought to the eyewear 10 with a convenient assembly process. The flexibility in the bridge portion 32 can enable shape memory or other resilient flexibility.

It can be appreciated that if the flexible component 14 is constructed separately rather than overmolded onto the rigid frame portions 12a, 12b, the bridge portion 32 would require slits or other passages 13a, 13b in order to allow the bridge portion 32 to completely surround the rigid frame portions 12a, 12b in the area shown in FIG. 5. The slits or passages 13a, 13b could then be closed and fused (e.g., via melting or molding) to complete the assembly, or otherwise be provided with suitable resiliency to make it difficult to remove the rigid frame portions 12a, 12b from the flexible component 14 thereafter.

Figure 7:
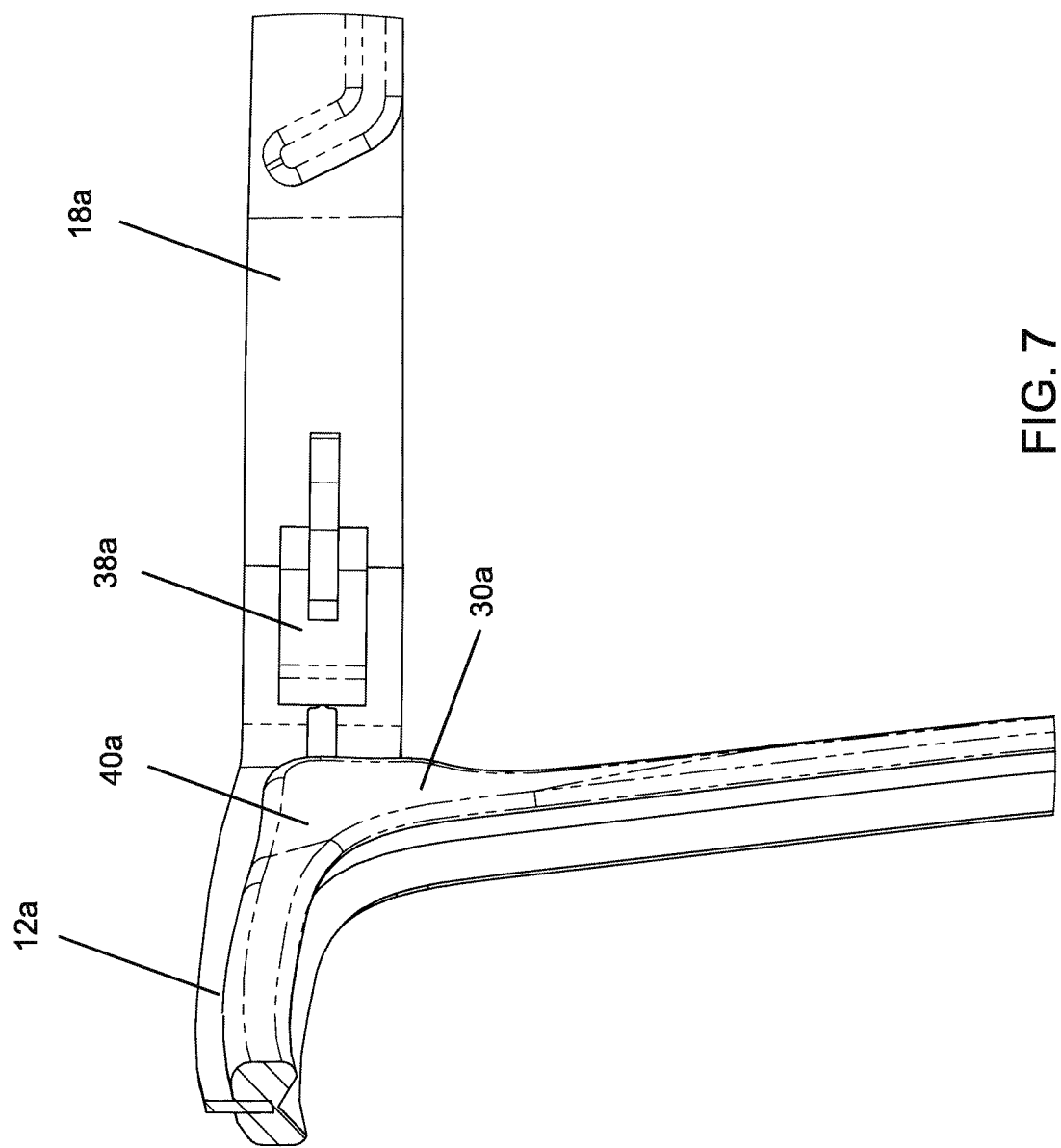
FIG. 7 is a sectional perspective view along line VII-VII in FIG. 2.

FIG. 7 provides another view of the flexible component 14 molded with or otherwise seated within the first rigid frame portion 12a. FIG. 7 illustrates that the flexible component 14 can also include a flap 40 at each corner, in the vicinity of the hinge components 38 and on the backside of the eyewear 10, to further stabilize the flexible component 14 against the rigid frame portions 12a, 12b. Specifically, in this example a first flap 40a is located near the first hinge component 38a, and a second flap 40b (see also FIG. 9) is located near the second hinge component 38b.

Figure 8A:
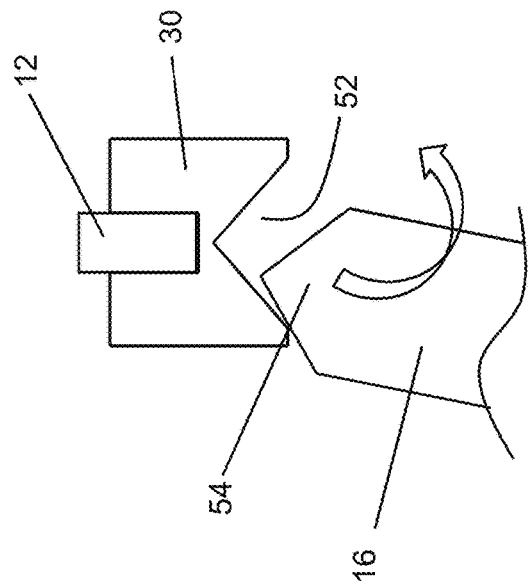
FIGS. 8A, 8B, and 8C are schematic illustrations showing insertion of the flexible component in a rigid component of the assembly, and insertion of a lens in the flexible component in assembling the eyewear.
Figure 8B:
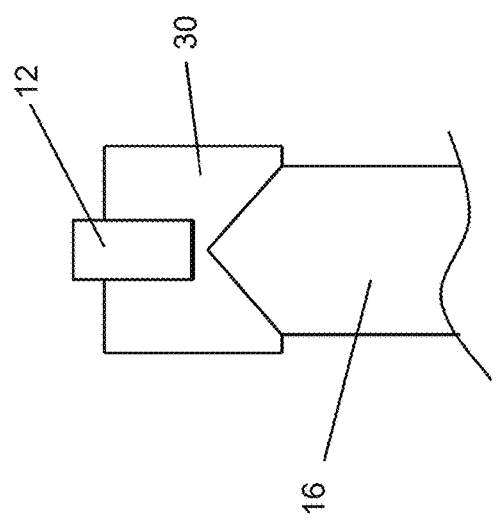
Figure 8C:
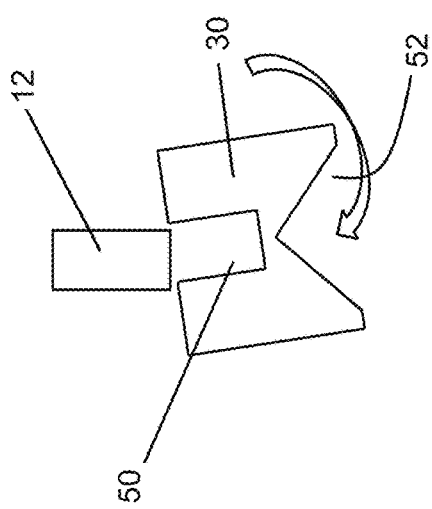

FIG. 8A illustrates a schematic cross-section of the lens retainer 30 portion of the flexible component 14. As can be seen in FIG. 8A, the flexible component 14 includes (or is otherwise provided with when overmolded with the rigid frame portion 12), a slot 50 or recess that permits the lens retainer 30 to be inserted and seat along the periphery of the inner edge of the centrally-open rigid frame portion 12. FIG. 8A provides an example in which a pre-molded flexible component 14 is assembled with the rigid frame portion 12 such that it is inserted along this inner edge to partially cover a portion of the front and back surfaces of the frame portion 12 as shown in FIG. 8B. It can be appreciated that when overmolding, the lens retainer 30 would be formed as shown in FIG. 8B following the overmolding process. FIG. 8B also illustrates insertion of the lens 16 into an inner slot or groove 52 (e.g., standard optician groove) in the lens retainer 30, that is opposite the slot 50. After insertion, as shown in FIG. 8C, the lens 16 is held firmly centered within the rigid frame portion 12, with the flexible component's lens retainer 30 is interposed therebetween. The slot 50 and groove 52 are aligned to provide this relative positioning and facilitate both assembly and maintenance (e.g. to replace lenses 16) as mentioned above.

Figure 9:
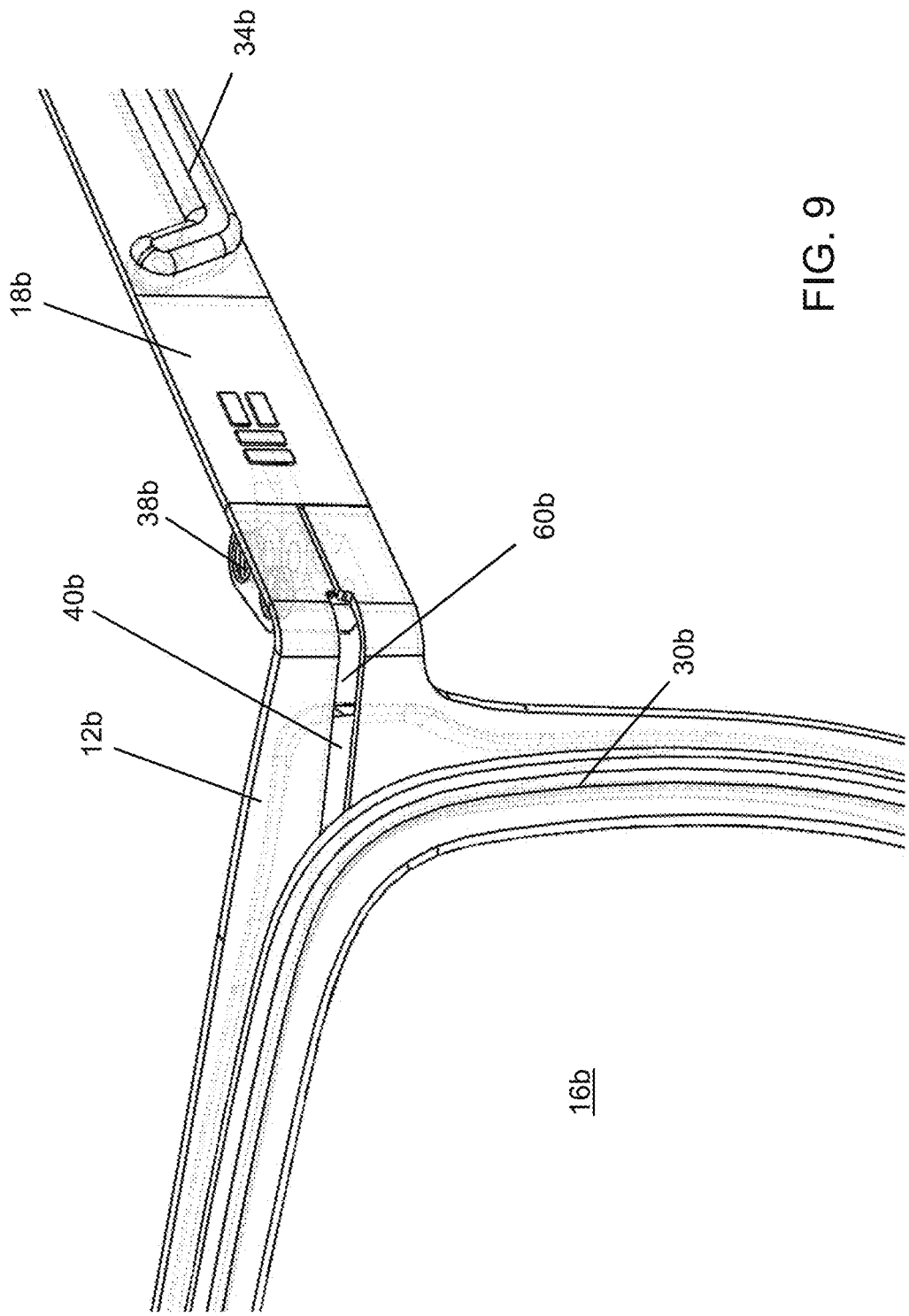
FIG. 9 is an enlarged perspective view of another portion of the assembled eyewear shown in FIG. 2.

Turning now to FIG. 9, an enlarged portion of the eyewear 10 is shown to illustrate that the rigid frame portions 12 (12b in this example) can optionally include a slot 60b to provide some resiliency in the rigid frame portion 12b during assembly. FIG. 9 also shows the second flap 40b positioned behind the slot 60b.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

Although the above principles have been described with reference to certain specific examples, various modifications thereof will be apparent to those skilled in the art as outlined in the appended claims.

The invention claimed is:

1. A flexible eyewear assembly comprising:
a first rigid frame portion have a first opening;
a second rigid frame portion having a second opening;
a flexible component comprising:
   a flexible bridge portion having a first end and a second end opposite the first end;
   a first flexible lens retainer extending from the first end of the flexible bridge portion; and
   a second flexible lens retainer extending from the second end of the flexible bridge portion;
   wherein the first and second flexible lens retainers follow and engage the interior periphery of the first and second openings in the rigid frame portions to be interposed between the first and second rigid frame portions and first and second lenses to retain the first and second lenses in the openings;
   wherein the first and second rigid frame portions are embedded in and pass through the first and second flexible lens retainers at points adjacent the flexible bridge portion to hold the eyewear assembly together by coupling the first and second rigid frame portions together, while providing flexibility of the assembly via the flexible bridge portion therebetween.

2. The flexible eyewear assembly of claim 1, wherein the flexible component is overmolded to the first and second rigid frame portions.

3. The flexible eyewear assembly of claim 1, wherein the first and second flexible lens retainers each have an outer slot for engaging the inner periphery of the opening of the corresponding one of the first and second rigid frame portions, and an inner ridge into which the corresponding one of the first and second lenses is seated.

4. The flexible eyewear assembly of claim 1, wherein the flexible component further comprises first and second flaps extending over a portion of a rear surface of respective one of the first and second rigid frame portions opposite the flexible bridge portion.

5. The flexible eyewear assembly of claim 1, wherein the flexible component is a separate component attached to the first and second rigid frame portions during assembly.

6. The flexible eyewear assembly of claim 5, wherein the flexible bridge portion comprises a pair of slits adjacent the flexible bridge portion to permit the first and second rigid frame portions to be inserted into the flexible component.

7. The flexible eyewear assembly of claim 1, further comprising first and second nose pieces coupled to respective ones of the first and second rigid frame portions.

8. The flexible eyewear assembly of claim 7, further comprising first and second nose pads coupled to respective ones of the first and second nose pieces.

9. The flexible eyewear assembly of claim 1, further comprising first and second arms coupled to respective ones of the first and second rigid frame portions.

10. The flexible eyewear assembly of claim 9, further comprising first and second hinges connecting the first and second arms to the respective ones of the first and second rigid frame portions.

11. The flexible eyewear assembly of claim 1, wherein each of the first and second rigid frame portions comprises a slit therein positioned in an area away from the flexible bridge portion when assembled.

12. The flexible eyewear assembly of claim 1, further comprising the first and second lenses.

13. A flexible component for eyewear, the flexible component comprising:
a flexible bridge portion having a first end and a second end opposite the first end;
a first flexible lens retainer extending from the first end of the flexible bridge portion; and
a second flexible lens retainer extending from the second end of the flexible bridge portion;
wherein the first and second flexible lens retainers are sized to follow and engage the interior periphery of first and second openings in first and second rigid frame portions to be interposed between the first and second rigid frame portions and first and second lenses to retain the first and second lenses in the openings therein; and
wherein the first and second rigid frame portions are embedded in and pass through the first and second flexible lens retainers at points adjacent the flexible bridge portion to hold the eyewear assembly together by coupling the first and second rigid frame portions together, while providing flexibility of the assembly via the flexible bridge portion therebetween.

14. The flexible component of claim 13, wherein the flexible component is overmolded to the first and second rigid frame portions.

15. The flexible component of claim 13, wherein the first and second flexible lens retainers each have an outer slot for engaging the inner periphery of the opening of the corresponding one of the first and second rigid frame portions, and an inner ridge into which the corresponding one of the first and second lenses is seated.

16. The flexible component of claim 13, wherein the flexible component further comprises first and second flaps extending over a portion of a rear surface of respective one of the first and second rigid frame portions opposite the flexible bridge portion.

17. The flexible component of claim 13, wherein the flexible component is a separate component attached to the first and second rigid frame portions during assembly.

18. The flexible component of claim 17, wherein the flexible bridge portion comprises a pair of slits adjacent the flexible bridge portion to permit the first and second rigid frame portions to be inserted into the flexible component.

* * * * *